United States Patent Office 3,497,329
Patented Feb. 24, 1970

3,497,329
PRODUCTION OF PHOSPHORIC ACID
Robert Amanrich and Gilbert Cousserans, Toulouse, France, assignors to Office National Industriel de l'Azote, Toulouse, France
Filed July 3, 1967, Ser. No. 650,880
Claims priority, application France, July 5, 1966, 68,128
Int. Cl. B01d 11/04; C01b 25/18
U.S. Cl. 23—299                    6 Claims

ABSTRACT OF THE DISCLOSURE

Process for the production of phosphoric acid from the product resulting from nitric acid attack on natural phosphates in which the nitric acid solutions are subjected to crystallization in two successive steps at temperatures ranging from 0° C. and 10° C., then —5° C. and —15° C., respectively, the mother-liquors from dewatering being treated by liquid-liquid extraction in the presence of a solvent chosen from the tertiary alcohols, such as tertiary amyl alcohol, the resulting solutions of nitric and phosphoric acids then being subjected to a secondary liquid-liquid extraction in the presence of an ester such as butyl acetate.

BACKGROUND OF THE INVENTION

Field of the invention

The present invention relates to an improved process for the production of practically pure phosphoric acid by extraction from the solution resulting from nitric acid attack on phosphatic ores, by means of polar organic solvents.

Description of the prior art

It is known that the attack on natural phosphates by nitric acid to produce phosphoric acid has the advantage of yielding calcium nitrate which is a valuable by-product for the fertilizer industry. However, the value of this procedure is closely related to the economics of the processes used to separate, on the one hand, the salt from the clarified acidic solutions and, on the other hand, the nitric acid from the phosphoric acid.

It is known to effect the separation of the calcium nitrate by low temperature crystallization, but this procedure does not provide to complete removal of either the calcium nitrate or the other impurities from phosphatic rocks, the latter being mainly constituted by fluorine, iron, aluminium and titanium compounds.

In recent years, considerable work has been devoted to selective extraction of phosphoric acid by using polar solvents wherein only phosphoric and nitric acids are soluble. Several processes for effecting this separation have been suggested, such processes being based primarily on the use of primary or secondary aliphatic alcohols, available in large quantities on the chemical market, such as butyl or amyl alcohols exhibiting both good selectivity and low water-miscibility under the particular conditions of use.

A variation of this type of process consists in separating, in a first step, a large fraction of calcium nitrate by cooling the attack medium, then dewatering, which permits the obtention of mother-liquors having higher phosphoric acid content.

SUMMARY OF THE INVENTION

It is accordingly one object of the present invention to provide a process for the production of phosphoric acid from solutions resulting from nitric acid attack on phosphate rock which overcomes or otherwise mitigates the problems of the prior art.

It is a further object of the present invention to provide a process for the production of phosphoric acid from solutions resulting from nitric acid attack on phosphate rocks by subjection of the solution to crystallization in two successive steps at different temperatures ranges, dewatering and then subjecting to two successive liquid-liquid extraction steps.

Other objects and advantages of the present invention will become apparent as the description thereof proceeds.

In satisfaction of the foregoing objects and advantages, there is provided a process for the production of phosphoric acid from the product resulting from nitric acid attack on natural phosphates comprising subjecting the nitric acid solutions to crystallization in two successive steps at temperatures ranging from 0° C. to 10° C., then —5° C. and —15° C., respectively, dewatering, and then subjecting the dewatered mother-liquors to a first liquid-liquid extraction in the presence of a tertiary alcohol solvent, and then a second liquid-liquid extraction in the presence of a secondary solvent.

BRIEF DESCRIPTION OF THE DRAWINGS

Reference is now made to the drawings accompanying this application wherein.

DESCRIPTION OF THE PREFERRED EMBODIMENTS

Figure 1:
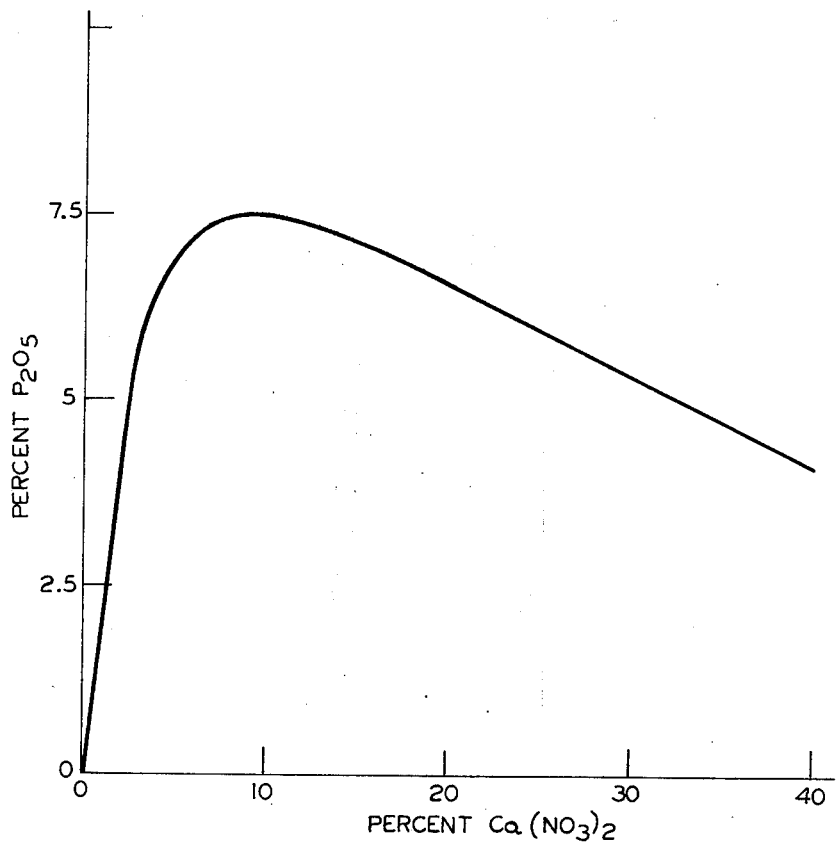
FIG. 1 represents a graph or curve showing the phosphorus pentoxide content in the raw extract as compared with the calcium nitrate content of the mixture to be extracted.

According to a first embodiment of the present invention, the preliminary removal of the calcium nitrate initially present in the attack solution is pushed to an optimum degree of about 95% by conducting two crystallizations in succession in which temperatures are maintained between 10° C. and 0° C., then between —5° C. and —15° C., respectively, followed by dewatering. More thorough removal is not desirable as such would result in reducing the phosphorus pentoxide content as shown by the curve for $P_2O_5$ percentages in the raw extract versus $Ca(NO_3)_2$ content of the mixture to extract (see FIG. 1), and would correspond to an increased consumption of energy under the form of frigories and steam.

The choice of an optimum degree for the separation of calcium nitrate offers the important advantages of providing, on the one hand, a procedure for obtaining a final extract higher in phosphoric acid, thus resulting in appreciable saving of steam and, on the other hand, reducing the nitric acid content of the solvent leading to substantial saving of solvent and easier subsequent separation between nitric and sulphuric acids.

According to a second embodiment of the invention, it has been found that it is preferable to choose the solvent used for extracting the acids from the mother-liquors coming from final dewatering of the attack liquor, from among the tertiary alcohols, rather than primary and secondary alcohols, the use of which has been previously described. Indeed, the resistance of tertiary alcohols to nitric oxidation has proven much higher than that of primary and secondary alcohols, this property being particularly advantageous in solvent recovery operations carried out by azeotropic distillation. Furthermore, the use of tertiary alcohol, such as tertiary amyl alcohol, results in a decrease in solvent volumes on stream and permits attainment of higher phosphoric acid concentrations and consequently a substantial reduction in steam consumption.

The comparative results achieved by use of 7-stage extraction by means of three different alcoholic solvents displaying the superiority of tertiary alcohols and, more particularly, of tertiary amyl alcohol, are shown in Table I. The procedure by which these comparative results were obtained was as follows:

Nitric attack solutions of phosphatic rocks, resulting from previous crystallization treatment in a first stage at +6° C., dewatered and subjected to extraction, were found to contain the following contents:

|  | Percent |
|---|---|
| $P_2O_5$ | 19.1 |
| $Ca(NO_3)_2$ | 28.0 |
| $HNO_3$ | 2.0 |

The operating conditions chosen corresponded, in any case, to $P_2O_5$ extraction proportion of 98%.

TABLE I

| Solvent | Weight ratio alcohol/mixture to extract | $P_2O_5$% in the extract |
|---|---|---|
| Isobutyl alcohol | 3.55 | 5.0 |
| OXO $C_5$ alcohol | 4.10 | 4.10 |
| Tertiary amyl alcohol | 3.07 | 5.70 |

It is to be seen that higher chemical resistance of tertiary alcohols, together with limitation of circulating liquids, result in large reduction in solvent consumption.

The invention is also concerned with final separation of the nitric acid and phosphoric acids present in the extract thus obtained. It is known that the extraction should be carried out in the presence of a large amount of nitric acid from the initial attack of phosphatic rocks and that it should remain with the phosphoric acid until the stage of final aqueous extraction. The latter comprises a dilute solution of the mixture of these acids whereof separation may be effected by rectification or preferably by liquid-liquid extraction by means of a secondary solvent such as a ketone or an ether.

According to the last embodiment of the invention, it has been found that certain organic esters, used as extracting agents for nitric and phosphoric acids, permit the obtention of markedly superior results. Such ester compounds of low water-miscibility have better chemical resistance to nitric acid, together with markedly higher selectivity, towards acids in effecting separation.

Generally speaking, the secondary extraction solvents of the invention are preferably chosen from among esters deriving from mono- or bifunctional acids, cyclic or cycloaliphatic, saturated or not, such as formates, acetates, oxalates, phthalates, etc., and from aliphatic, cyclic or cycloaliphatic alcohols saturated or not, such as ethyl, propyl, isopropyl, butyl, amyl, isoamyl alcohols, etc. Although all the compounds corresponding to the above characteristics belong to the secondary solvents of the invention, it is preferable to employ butyl acetate as the secondary solvent as it is an economical and easily available product.

The experimental results achieved with several of the secondary solvents of the invention, compared with various ketones, are set forth in Tables II and III below. The solutions to be extracted were obtained from extraction operations carried out on a mixture containing by weight 10% of phosphoric acid, 10% of nitric acid and 80% of water, treated with three times their weight thereof of solvent (Table II), and from a mixture containing by weight 30% of phosphoric acid, 30% of nitric acid and 40% of water treated with twice the weight thereof of solvent, respectively (Table III). The results show the surprising efficiency of the secondary solvents of the invention.

TABLE II

| Solvent | $K_{NO_3H}$ | $K_{PO_4H_3}$ | Selectivity |
|---|---|---|---|
| Methyl isobutyl ketone | 0.255 | 0.012 | 20 |
| Ethyl-amyl ketone | 0.120 | 0.050 | 24 |
| Diisobutyl ketone | 0.075 | 0.003 | 25 |
| Heptyl isobutyl ketone | 0.042 | 0.000 | ∞ |
| Propyl acetate | 0.035 | 0.010 | 35 |
| Isopropyl acetate | 0.180 | 0.001 | 180 |
| Butyl acetate | 0.297 | 0.007 | 42 |
| Isoamyl acetate | 0.105 | 0.000 | ∞ |

TABLE III

| Solvent | $K_{NO_3H}$ | $K_{PO_4H_3}$ | Selectivity |
|---|---|---|---|
| Methylisobutyl ketone | 2.69 | 0.09 | 30.9 |
| Ethyl-amyl ketone | 2.35 | 0.03 | 78 |
| Isopropyl acetate | 3.08 | 0.07 | 44 |
| Butyl acetate | 2.70 | 0.006 | 450 |

As is clear from the above, very good separation is achieved between phosphoric and nitric acids when the solution subjected to a secondary extraction which contains a weight of water ranging from 36% to 80%. For lower contents, solvent miscibility in water becomes important and any quantitative separation becomes impossible, whereas for higher contents the separation is incomplete as phosphoric acid still contains nitric acid. On the other hand, the ratio of secondary solvent to acidic solution by weight should be chosen between about 1 and 7, according to total acid concentration of the solution subjected to the secondary extraction. When the total acid content nears the upper limit of 60% to 65%, correspondingly low solvent ratios should be used, and conversely, solutions of acid concentrations of about 20% should be treated in the presence of larger amounts of solvent. In this connection, it should be pointed out that the relative proportion of both acids in the mixture has a practically negligible influence and that only the total acid concentration is the determining factor.

Figure 2:
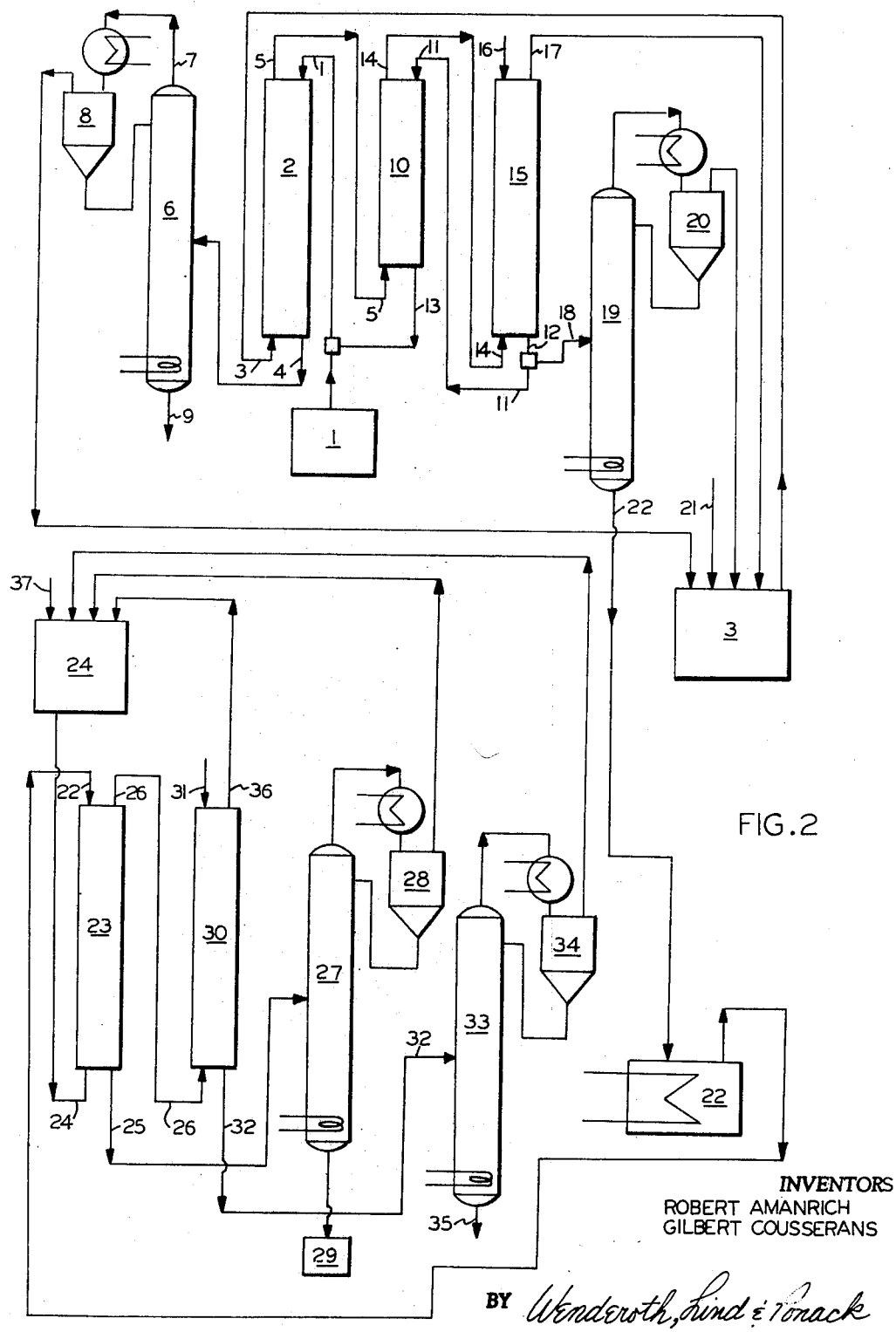
FIG. 2 illustrates a diagrammatic view of an apparatus for carrying out the process of this invention.

The following is an example of a specific embodiment of the process and relates to the diagrammatic drawing of FIG. 2 annexed to the specification and is intended only for descriptive purposes and should not be interpreted as limiting the invention in any way.

EXAMPLE

A plant for the production of phosphoric acid corresponding to 1 ton/hour of $P_2O_5$ was fed with Moroccan natural phosphate of the following composition:

|  | Percent |
|---|---|
| $P_2O_5$ | 34.5 |
| $CaO$ | 54.0 |
| $SO_3$ | 1.7 |
| $F$ | 3.9 |
| $Fe_2O_3$ | 0.3 |
| $Al_2O_3$ | 0.4 |
| $MgO$ | 0.7 |
| $SiO_2$ | 1.0 |
| $CO_2$ | 0.75 |

3 tons of the above finely ground ore were then attacked with 6,330 kg. of 60% $HNO_3$, followed by two successive crystallizations at +6° C. and −10° C. respectively, to yield, after final dewatering, on the one hand, 6,500 kg. of crystals chiefly comprising 4,500 kg. of $Ca(NO_3)_2$ and 2,000 kg. of crystallization water and, on the other hand, 2,800 kg. of crystallization water and, on the other hand, 2,800 kg. of mother-liquors containing mainly:

|  | Kg. |
|---|---|
| $PO_4H_3$ (49.8%) | 1,395 |
| $HNO_3$ (3.2%) | 90 |
| $Ca(NO_3)_2$ (8.0%) | 225 |

These mother liquors contained in container 1 were fed at room temperature via line 1 to a liquid-liquid extraction apparatus 2 comprising 7 theoretical stages where they were treated in counterflow with 11,200 kg. of solvent 3 constituted of:

| | Kg. |
|---|---|
| $HNO_3$ | 110 |
| Water | 3,020 |
| Tertiary amyl alcohol | 8,069 |
| $H_3PO_4$ | 1 |

After this primary extraction, 4,100 kg. of raffinate via line 4 and 10,610 kg. of raw extract were obtained via line 5.

Raffinate 4 was constituted by the following mixture:

| | Kg. |
|---|---|
| $H_3PO_4$ | 15 |
| $HNO_3$ | 20 |
| $Ca(NO_3)_2$ | 225 |
| Tertiary amyl alcohol | 410 |
| Water | 3,430 |

The tertiary amyl alcohol as then recovered from the raffinate by distillation in 6 and decantation in 8 from distillate 7 to yield 408 kg. of tertiary amyl alcohol and 124 kg. of water.

Owing to the high dilution of bottoms 9, it was not economical to treat the same to extract the small amounts of $Ca(NO_3)_2$ contained therein.

The raw extract 5 containing the following

| | Kg. |
|---|---|
| $H_3PO_4$ | 1,556 |
| $HNO_3$ | 215 |
| Tertiary amyl alcohol | 7,674 |
| $CA(NO_3)_2$ | 16 |
| Water | 1,149 | was purified in a liquid-liquid extraction apparatus 10, comprising 4 theoretical stages, wherein it was contacted in counterflow with a portion 11 of the heavier phase from the following re-extraction operation.

Heavier fraction 13, obtained in the purification step, contained the total calcium nitrate present in the raw extract, constituting a mixture of the following:

| | Kg. |
|---|---|
| $H_3PO_4$ | 175 |
| $HNO_3$ | 35 |
| $Ca(NO_3)_2$ | 16 |
| Alcohol | 15 |
| Water | 469 | was recycled to the mother-liquors fed to primary extraction apparatus 2.

Purified extract 14 constituting a mixture of

| | Kg. |
|---|---|
| $H_3PO_4$ | 1,725 |
| $HNO_3$ | 217 |
| Tertiary amyl alcohol | 7,744 |
| Water | 1,264 | contained only minute amounts of impurities. It was fed to a re-extraction unit 15 constituted by a liquid-liquid extraction column comprising 7 theoretical stages, wherein it was treated in counterflow with 4,190 kg. of purified water 16. This water 16 re-extracted almost all of the phosphoric acid, together with a large portion of the nitric acid present in the purified extract and yielded 5,270 kg. of heavier phase 12 and 9,870 kg. of lighter phase 17.

Heavier phase 12 contained

| | Kg. |
|---|---|
| $H_3PO_4$ | 1,704 |
| $HNO_3$ | 187 |
| Tertiary amyl alcohol | 425 |
| Water | 2,934 | and was separated into two parts weighing 1,050 kg. and 4,220 kg. respectively.

The former 11 flowed back to purification apparatus 10 at a reflux ratio of 0.10.

The latter 18, containing

| | Kg. |
|---|---|
| $H_3PO_4$ (say 1,000 kg. of $P_2O_5$) | 1,380 |
| $HNO_3$ | 150 |
| Tertiary amyl alcohol | 340 |
| Water | 2,350 | was subjected to distillation in 19 and yielded 440 kg. of top fraction 20, constituted by 337 kg. of tertiary amyl alcohol and 103 kg. of water.

Solvent 3 from the primary extraction was reconstituted by adding to said top fraction, on the one hand, alcohol recovered by distillation of raffinate 4, and the 9,870 kg. of lighter phase 17, containing

| | Kg. |
|---|---|
| $H_3PO_4$ | 1 |
| $HNO_3$ | 30 |
| Tertiary amyl alcohol | 7,319 |
| Water | 2,250 | and, on the other hand 133 kg. of 60% nitric acid and 220 kg. of water 21 as make-up.

Bottoms 22 containing

| | Kg. |
|---|---|
| $H_3PO_4$ | 1,380 |
| $HNO_3$ | 150 |
| Water | 2,247 | owing to the low nitric acid content thereof, may be used directly as a base to produce fertilizing solutions.

However, when it was desired to produce phosphoric acid free from nitric acid, said bottoms 22 were subjected, after cooling, to secondary extraction in an apparatus 23 comprising 7 theoretical stages, wherein they were treated in counterflow with 7,554 kg. of secondary solvent 24 constituted by the mixture of 7,517 kg. of butyl acetate and 37 kg. of water.

There were thus obtained, on the one hand, 3,512 kg. of heavier phase 25 totally free from nitric acid, containing

| | Kg. |
|---|---|
| $H_3PO_4$ | 1,380 |
| Butyl acetate | 32 |
| Water | 2,100 | and, on the other hand, 7,819 kg. of lighter phase 26 constituted by

| | Kg. |
|---|---|
| $HNO_3$ | 150 |
| Butyl acetate | 7,485 |
| Water | 184 |

The heavier phase yielded, by distillation in 27, 31 kg. of product 28, containing 30 kg. of butyl acetate and 1 kg. of water, which was recycled to the solvent feeding circuit 24 from the secondary extraction, and 3,480 kg. of phosphoric acid solution 29, from which, after concentrating, 1,380 kg. of pure phosphoric acid was obtained (containing 55% of $P_2O_5$).

The analysis of the phosphoric acid was as follows:

| | Percent |
|---|---|
| $P_2O_5$ | 55 |
| $HNO_3$ | 0.05 |
| CaO | 0.075 |
| MgO | 0.004 |
| $Al_2O_3$ | Indeterminable |
| $Fe_2O_3$ | Indeterminable |
| $SO_3$ | Indeterminable |
| F | 0.065 |

Lighter phase 26 was fed to liquid-liquid extraction apparatus 30 comprising 7 theoretical stages wherein it was treated in counterflow with 3,100 kg. of purified water 31. From this, there were obtained, on the one hand, 3,439 kg. of a mixture containing:

| | Kg. |
|---|---|
| $HNO_3$ | 150 |
| Butyl acetate | 35 |
| Water | 3,254 | which, when subjected to distillation in 33 permitted the recovery of 35 kg. of mixture 34, 34 kg. of butyl acetate, and 1 kg. of water, which was recycled to solvent feeding circuit 24 from secondary extraction. The 3,218 kg. of residual product 35 may advantageously be used to absorb nitrous fumes in a nitric acid plant. The 7,480 kg. butyl acetate with 0.4% by weight of water 36 was also recycled to solvent feeding circuit 24 and to secondary extraction whereto 4 kg. of butyl acetate and 5 kg. of water 37 were added.

Generally speaking, steam consumption to manufacture 1 ton of phosphoric acid in the acid produced from the starting mother-liquors containing 19% of $P_2O_5$ and 28.5% of $Ca(NO_3)_2$ was about 7 tons, preliminary treatment of the initial medium comprising one dewatering operation only. It was 3 tons only when two dewatering operations took place as described in the present example.

This invention may be summarized as follows: A process for the production of phosphoric acid from solutions resulting from nitric acid attack on phosphate rocks, characterized by the following points, taken singly or in any combination:

(1) Nitric acid solutions are subjected to two successive crystallization steps at temperatures ranging between 0° C. and 10° C., then −5° C. and −15° C. respectively, each followed by dewatering;

(2) Mother-liquors resulting from the recrystallization operation, as described in (1), are subjected to liquid-liquid extraction in the presence of an extraction solvent chosen from the tertiary alcohols, such as tertiary amyl alcohol;

(3) The solutions of phosphoric and nitric acids resulting from the liquid-liquid extraction operations, as described in (2), containing from 36% to 80% water, are subjected to secondary liquid-liquid extraction in the presence of a secondary extraction solvent chosen from the esters derived from saturated or unsaturated mono- or bifunctional aliphatic, cyclic or cycloaliphatic acids and saturated or unsaturated aliphatic, cyclic or cycloaliphatic alcohols, such as butyl acetate, with a secondary solvent to acid solution weight ratio comprising between 1 and 7, the obtained raffinate being treated with a view to recover the secondary solvent and nitric acid, and the extract being separated from the solvent and concentrated to yield pure phosphoric acid.

The products obtained by the manufacturing processes described hereinabove may be used as follows:

(1) The solutions of nitric and phosphoric acids are directly utilizable in the manufacture of liquid fertilizers;

(2) Pure phosphoric acid containing 55% of $P_2O_5$ may be recovered from the solutions of nitric and phosphoric acids;

(3) Calcium nitrate may be recovered from solutions resulting from the nitric attack of phosphatic rocks; and (4) The residual solutions of nitric acid produced in the secondary extraction operation may be recovered.

What is claimed is:

1. A process for the production of phosphoric acid from the product resulting from nitric acid attack on natural phosphates comprising subjecting the nitric acid solution to crystallization in two successive steps at temperatures ranging between 0° C. and 10° C., then −5° C. and −15° C., respectively, to crystallize and separate out calcium nitrate in each step, subjecting the resulting solution to dewatering, and then subjecting the dewatered solution to a first liquid-liquid extraction in the presence of a tertiary alcohol solvent, to extract phosphoric acid and nitric acid into the alcohol phase, recovering the phosphoric acid-nitric acid mixture from the alcohol phase, and subjecting the acid mixture to a second liquid-liquid extraction in the presence of an organic ester solvent, and recovering the purified phosphoric acid from the ester phase.

2. A process according to claim 1 wherein the tertiary alcohol employed in the first liquid-liquid extraction step is a tertiary aliphatic alcohol.

3. A process according to claim 1 wherein the tertiary alcohol employed in the first liquid-liquid extraction step is tertiary butyl alcohol.

4. A process according to claim 1 wherein the solvent employed in the second liquid-liquid extraction step is an organic ester selected from the group consisting of esters derived from saturated and unsaturated mono- or bifunctional aliphatic, cyclic and cycloaliphatic alcohols.

5. A process according to claim 4 wherein the solvent employed in the second liquid-liquid extraction step is selected from the group consisting of propyl acetate, isopropyl acetate, butyl acetate and isoamyl acetate.

6. A process according to claim 1 wherein the solution of phosphoric and nitric acids resulting from the first liquid-liquid extraction step contains from 36% to 80% water.

References Cited

UNITED STATES PATENTS

| 1,876,501 | 9/1932 | Johnson | 23—102 |
| 2,813,777 | 11/1957 | Swensen | 23—304 X |
| 2,885,265 | 5/1959 | Cunningham | 23—312 X |
| 3,298,782 | 1/1967 | Archambault | 23—312 X |
| 3,304,157 | 2/1967 | Baniel | 23—312 X |
| 3,342,580 | 9/1967 | Rooij | 23—165 X |
| 3,387,930 | 6/1968 | Schertzer | 23—312 X |
| 3,388,967 | 6/1968 | Ramaradhya | 23—312 X |

FOREIGN PATENTS

| 33,843 | 1964 | East Germany. |
| 50,587 | 1966 | East Germany. |
| 65,772 | 1949 | Netherlands. |
| 494,045 | 6/1953 | Canada. |
| 932,215 | 7/1963 | Great Britain. |

WILBUR L. BASCOMB, Jr., Primary Examiner

S. J. EMERY, Assistant Examiner

U.S. Cl. X.R.

23—102, 165, 304